(12) United States Patent
Suzuki et al.

(10) Patent No.: US 11,267,311 B2
(45) Date of Patent: Mar. 8, 2022

(54) VEHICULAR AIR CONDITIONER

(71) Applicant: KEIHIN CORPORATION, Tokyo (JP)

(72) Inventors: Hiroto Suzuki, Utsunomiya (JP); Takehito Hashimoto, Shioya-gun (JP)

(73) Assignee: KEIHIN CORPORATION, Tokyo (JP)

( * ) Notice: Subject to any disclaimer, the term of this patent is extended or adjusted under 35 U.S.C. 154(b) by 145 days.

(21) Appl. No.: 16/711,693

(22) Filed: Dec. 12, 2019

(65) Prior Publication Data

US 2020/0215873 A1 Jul. 9, 2020

(30) Foreign Application Priority Data

Jan. 9, 2019 (JP) .............................. JP2019-002148

(51) Int. Cl.
*B60H 1/00* (2006.01)
*B60H 1/24* (2006.01)

(52) U.S. Cl.
CPC ..... *B60H 1/00664* (2013.01); *B60H 1/00871* (2013.01); *B60H 1/241* (2013.01); *B60H 1/00028* (2013.01)

(58) Field of Classification Search
CPC ............ B60H 1/00664; B60H 1/00671; B60H 1/00871; B60H 1/00835; B60H 1/241; B60H 2001/00721
USPC .................................. 454/152, 156, 159, 161
See application file for complete search history.

(56) References Cited

U.S. PATENT DOCUMENTS

| | | | | |
|---|---|---|---|---|
| 5,309,731 A * | 5/1994 | Nonoyama | ........ | B60H 1/00849 62/244 |
| 6,166,351 A * | 12/2000 | Yamamoto | ......... | B60H 1/00064 219/202 |
| 6,782,944 B2 * | 8/2004 | Kim | ................... | B60H 1/00064 165/203 |
| 2003/0056531 A1 * | 3/2003 | Nishida | .............. | B60H 1/00064 62/244 |
| 2004/0231834 A1 * | 11/2004 | Shibata | .............. | B60H 1/00678 165/204 |
| 2008/0200110 A1 * | 8/2008 | Ghosh | ................ | B60H 1/00671 454/160 |
| 2009/0117841 A1 * | 5/2009 | Goto | .................. | B60H 1/00064 454/127 |

(Continued)

FOREIGN PATENT DOCUMENTS

DE 19955616 C1 * 11/2000 ......... B60H 1/00064
JP 6201621 B 9/2019

*Primary Examiner* — Vivek K Shirsat
*Assistant Examiner* — Ko-Wei Lin
(74) *Attorney, Agent, or Firm* — Cantor Colburn LLP

(57) ABSTRACT

Provided is a vehicular air conditioner including: an air-conditioning case that has an upper passage and a lower passage which are partitioned by an upper and lower partition plate therebetween; a heating unit that is disposed over the upper passage and the lower passage; an upper passage partition plate that is disposed downstream of the heating unit of the upper passage and forms a guide passage that guides a portion of air, which has passed the heating unit, toward an upper and lower connection opening that connects the upper passage and the lower passage; and a guide passage opening/closing unit that closes the guide passage in a state where the upper and lower connection opening is closed.

8 Claims, 9 Drawing Sheets

(56) References Cited

U.S. PATENT DOCUMENTS

| | | | |
|---|---|---|---|
| 2013/0319630 A1* | 12/2013 | Yamamoto | B60H 1/00764 165/42 |
| 2014/0194048 A1* | 7/2014 | Wittmann | B60H 1/24 454/139 |
| 2018/0126820 A1* | 5/2018 | Makimoto | B60H 1/00835 |

* cited by examiner

VEHICULAR AIR CONDITIONER

CROSS REFERENCE TO RELATED APPLICATION

The present invention claims priority under 35 U.S.C. § 119 to Japanese Patent Application No. 2019-002148, filed on Jan. 9, 2019, the entire content of which is incorporated herein by reference.

BACKGROUND OF THE INVENTION

Field of the Invention

The present invention relates to a vehicular air conditioner.

Description of Related Art

In the related art, vehicles, such as four-wheel vehicles, are equipped with a vehicular air conditioner that generates air (conditioned air) of which the temperature and humidity have been adjusted. This vehicular air conditioner includes therein an air-conditioning case having a flow passage through which air flow. An evaporator that cools air and a heater that heats air are housed inside the air-conditioning case. In such a vehicular air conditioner, conditioned air having a desired temperature is generated by heating at least a portion of the air cooled to a certain temperature by the evaporator with a heater and adjusting the flow rate of the air to be heated by the heater.

For example, Japanese Patent No. 6201621 (hereinafter referred to as Patent Document 1) discloses a vehicular air conditioner that includes an upper and lower partition plate that partitions the inside of an air-conditioning case into an upper passage and a lower passage, and that allows the air to be supplied to the upper passage and the lower passage to be selected between ambient air and internal air.

SUMMARY OF THE INVENTION

Meanwhile, as in Patent Document 1, in the vehicular air conditioner in which the inside of the air-conditioning case is partitioned by the upper and lower partition plate, the air that flows mainly through a lower passage is discharged from a foot opening (an opening for discharging the conditioned air to be supplied to passenger's feet) provided at a lower part of the air-conditioning case. For this reason, in order to allow the conditioned air with sufficient flow rate to be discharged from the foot opening as necessary, in Patent Document 1, an upper and lower connection opening for supplying a portion of the conditioned air, which flows through the upper passage, to the lower passage is provided. Additionally, in Patent Document 1, a partition plate different from the above-described upper and lower partition plate is provided inside the upper passage, and a portion of the conditioned air warmed with the heater is guided toward the upper and lower connection opening by the partition plate.

On the other hand, the upper and lower connection opening is openable and closable by a mode door. For this reason, the conditioned air guided by the partition plate cannot pass through the upper and lower connection opening in a case where the upper and lower connection opening is closed. Thus, in Patent Document 1, an openable/closable recirculation opening is provided between the partition plate and the inner wall of the air-conditioning case. In a case where the upper and lower connection opening is closed, the recirculation opening is opened to recirculate the conditioned air to a space above the partition plate. However, in the vehicular air conditioner disclosed in such Patent Document 1, in a case where the upper and lower connection opening is not opened, the conditioned air, which has passed through the heater in the upper passage, flows at such a long distance that the conditioned air flows below the partition plate and further reaches the space above the partition plate via the recirculation opening. Therefore, the pressure loss in the upper passage increases.

The present invention has been made in view of the above-described problems, and an object thereof is to reduce pressure loss inside an air-conditioning case in a case where an upper and lower connection opening that connects an upper passage and a lower passage is closed, in the vehicular air conditioner in which the inside of the air-conditioning case is partitioned into the upper passage and the lower passage by an upper and lower partition plate.

The present invention adopts the following configurations for solving the above problems.

(1) A vehicular air conditioner includes: an air-conditioning case that has an upper passage and a lower passage which are partitioned by an upper and lower partition plate therebetween; a heating unit that is disposed over the upper passage and the lower passage; an upper passage partition plate that is disposed downstream of the heating unit of the upper passage and forms a guide passage that guides a portion of air, which has passed the heating unit, toward an upper and lower connection opening that connects the upper passage and the lower passage; and a guide passage opening/closing unit that closes the guide passage in a state where the upper and lower connection opening is closed.

(2) In the vehicular air conditioner described in the above (1), the guide passage opening/closing unit may have a first sealing part that allows the upper and lower connection opening to be opened and closed, and a second sealing part that allows an outlet opening of the guide passage to be opened and closed, and closes the outlet opening in a state where the first sealing part closes the upper and lower connection opening.

(3) In the vehicular air conditioner of the above (1), the following configuration may be adopted: a recirculation opening that allows air, which is discharged from an outlet opening of the guide passage, to be recirculated to a space above the upper passage partition plate is provided inside the air-conditioning case; and the guide passage opening/closing unit has a first sealing part that allows the upper and lower connection opening to be opened and closed, and a third sealing part that allows the recirculation opening to be opened and closed, and closes the recirculation opening in a state where the first sealing part closes the upper and lower connection opening.

(4) In the vehicular air conditioner described in the above (2), the following configuration may be adopted: a foot opening, which communicates with the lower passage and discharges the air to be supplied to passenger's feet is provided in the air-conditioning case, and the guide passage opening/closing unit has a fourth sealing part that allows the foot opening to be opened and closed.

(5) In the vehicular air conditioner described in the above (3), the following configuration may be adopted: a foot opening, which communicates with the lower passage and discharges the air to be supplied to passenger's feet is provided in the air-conditioning case, and the guide passage opening/closing unit has a fourth sealing part that allows the foot opening to be opened and closed.

(6) In the vehicular air conditioner described in the above (4), the following configuration may be adopted: the fourth sealing part opens the foot opening in a state where the upper and lower connection opening is closed, and closes the foot opening in a state where the upper and lower connection opening is opened.

(7) In the vehicular air conditioner described in the above (5), the following configuration may be adopted: the fourth sealing part opens the foot opening in a state where the upper and lower connection opening is closed, and closes the foot opening in a state where the upper and lower connection opening is opened.

(8) In the vehicular air conditioner described in the above (1), the upper passage partition plate may extend toward the upper and lower connection opening at an outlet end of the guide passage.

(9) In the vehicular air conditioner described in any one of the above (1) to the above (8), a gap opening may be provided between the heating unit, and an upstream end of the upper passage partition plate.

(10) In the vehicular air conditioner described in the above (4), the upper passage partition plate may have a through opening that connects the guide passage, and a space above the upper passage partition plate, between an upstream end and a downstream end.

(11) In the vehicular air conditioner described in the above (5), the upper passage partition plate may have a through opening that connects the guide passage, and a space above the upper passage partition plate, between an upstream end and a downstream end.

According to the above respective aspects of the invention, in a state where the upper and lower connection opening that connects the upper passage and the lower passage is closed, the guide passage, which guides a portion of air toward the upper and lower connection opening, is closed by the guide passage opening/closing unit. For this reason, air is prevented from flowing into the guide passage in a state where the upper and lower connection opening is closed, and the air flowing through the upper passage flows into the space above the upper passage partition plate without going via the guide passage and the recirculation opening. For this reason, according to the invention, in the vehicular air conditioner in which the inside of the air-conditioning case is partitioned into the upper passage and the lower passage by the upper and lower partition plate, it is possible to reduce the pressure loss inside the air-conditioning case in a case where the upper and lower connection opening that connects the upper passage and the lower passage is closed.

DETAILED DESCRIPTION OF THE INVENTION

Hereinafter, respective embodiments of a vehicular air conditioner related to the present invention will be described with reference to the drawings.

(First Embodiment)

Figure 1:
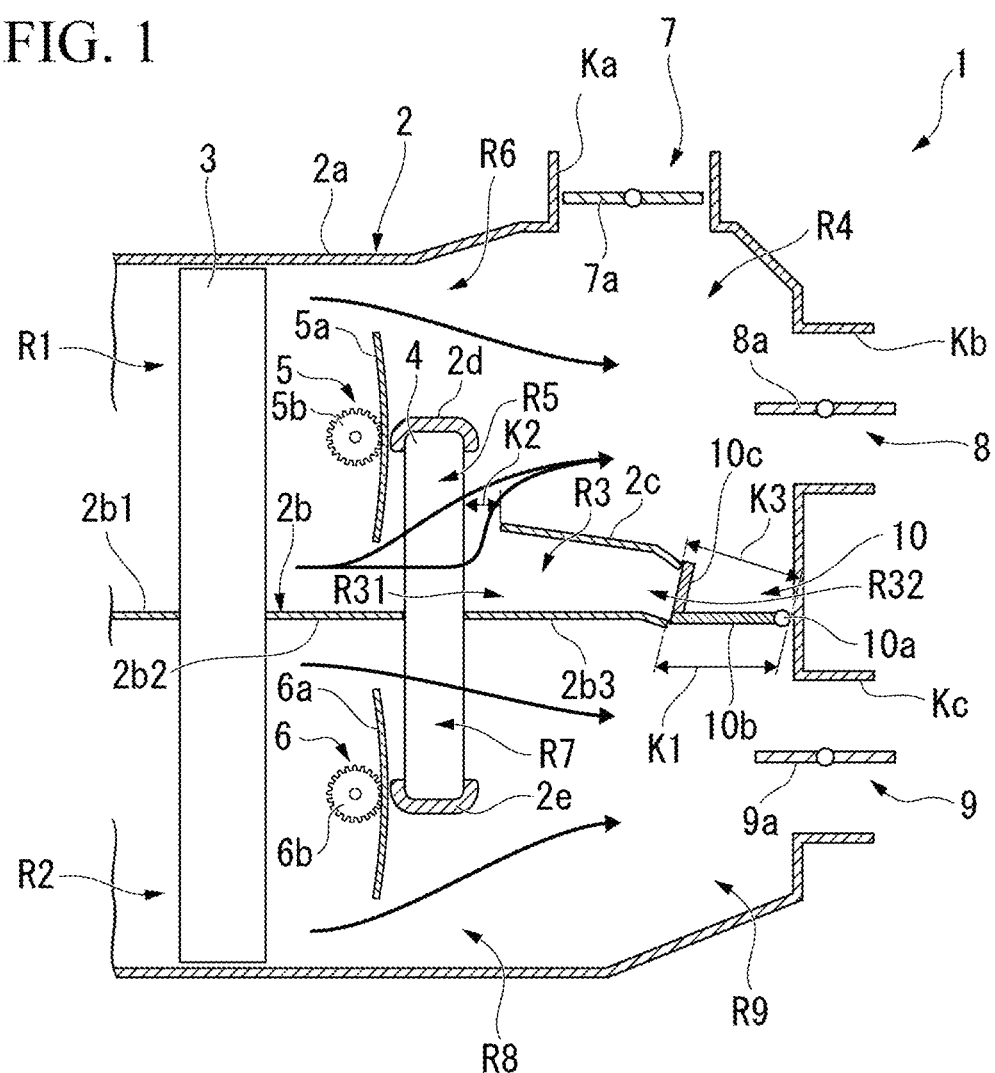
FIG. 1 is a vertical sectional view schematically illustrating a schematic configuration of a vehicular air conditioner in a first embodiment of the invention.

FIG. 1 is a vertical sectional view schematically illustrating a schematic configuration of a vehicular air conditioner 1 of the present embodiment. As illustrated in FIG. 1, the vehicular air conditioner 1 of the present embodiment includes an air-conditioning case 2, an evaporator 3, a heater core 4 (heating unit), an upper air mixing door mechanism 5, a lower air mixing door mechanism 6, a defroster opening opening/closing mechanism 7, a face opening opening/closing mechanism 8, a foot opening opening/closing mechanism 9, and a guide passage opening/closing mechanism 10 (guide passage opening/closing unit).

The air-conditioning case 2 is a casing that houses the evaporator 3, the heater core 4, and the like as illustrated in FIG. 1, and has therein a flow passage through which air flows. The air-conditioning case 2 has a plurality of partition walls that are disposed inside the outer shell wall 2a to partition an internal space of the air-conditioning case 2, a supporting wall that supports the evaporator 3 and the like, and the like, in addition to an outer shell wall 2a that forms an external shape of the air-conditioning case 2. The air-conditioning case 2 has, for example, an upper and lower partition plate 2b and an upper passage partition plate 2c, as the above partition walls. Additionally, the air-conditioning case 2 has, for example, a heater core upper end supporting wall 2d and a heater core lower end supporting wall 2e, as the above supporting wall.

The upper and lower partition plate 2b is a plate-shaped part that is disposed substantially horizontally so as to vertically partition the inside of the outer shell wall 2a. The inside of the air-conditioning case 2 is partitioned into an upper passage R1 and a lower passage R2 by such an upper and lower partition plate 2b. The upper and lower partition plate 2b has an upstream partition plate 2b1 disposed on an upstream side of the evaporator 3 (a front side in the forward-backward direction of a vehicle in the present embodiment and a left side of the paper face in FIG. 1), and an intermediate partition plate 2b2 disposed between the evaporator 3 and the heater core 4, and a downstream partition plate 2b3 disposed on a downstream side of the heater core 4 (a rear side in the forward-backward direction of the vehicle in the present embodiment and a right side of the paper face in FIG. 1).

The downstream partition plate 2b3 and the outer shell wall 2a are spaced apart from each other in a horizontal direction. That is, a gap is provided between the downstream partition plate 2b3, and an inner wall surface of the outer shell wall 2a. The gap functions as an upper and lower connection opening K1 that connects the upper passage R1 and the lower passage R2. It is possible for the air flowing through the upper passage R1 to flow into the lower passage R2 via the upper and lower connection opening K1, and for the air flowing through the lower passage R2 to flow into the upper passage R1 via the upper and lower connection opening K1. In addition, whether air flows into the upper and lower connection opening K1 from any of the upper passage R1 and the lower passage R2 is determined depending on a state in each of the defroster opening opening/closing mechanism 7, the face opening opening/closing mechanism 8, and the foot opening opening/closing mechanism 9 (that is, the opened/closed state of a defroster opening Ka, a face opening Kb, and a foot opening Kc to be described below).

Figure 2:
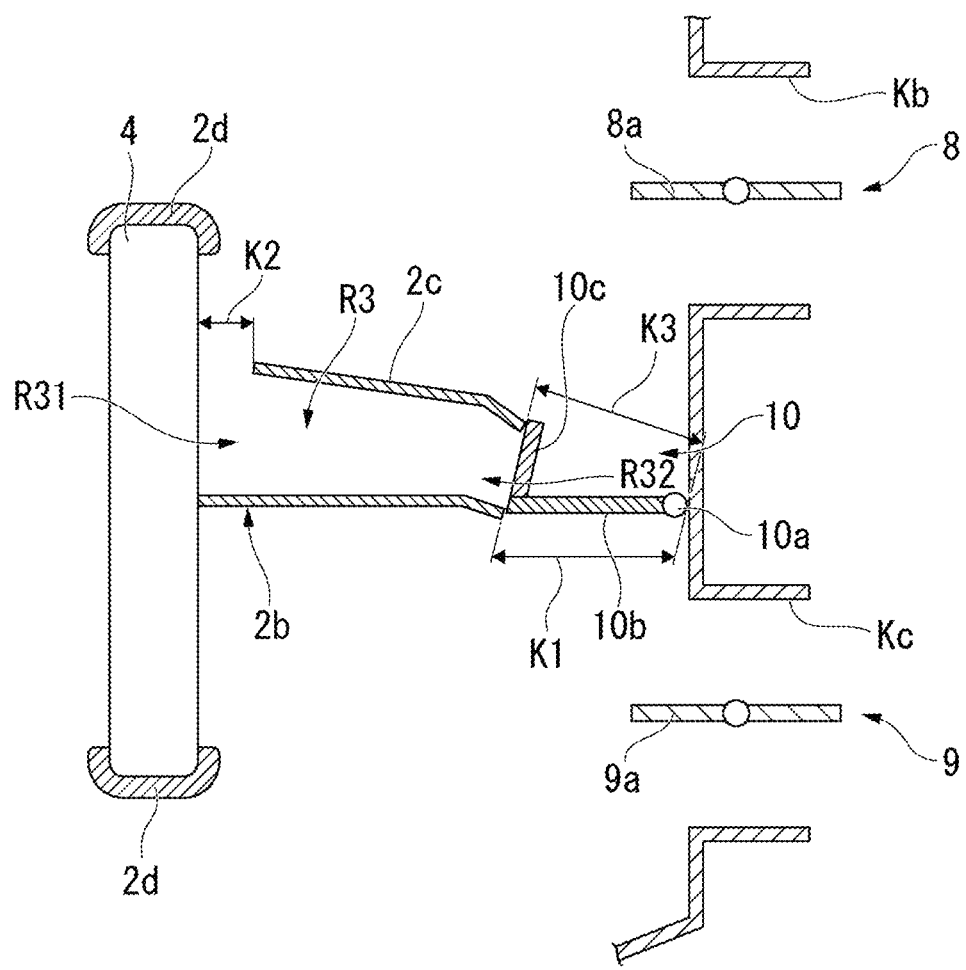
FIG. 2 is an enlarged vertical sectional view of main parts of the vehicular air conditioner in the same embodiment.

FIG. 2 is a partial enlarged vertical sectional view of the air-conditioning case 2, including the upper passage partition plate 2c. The upper passage partition plate 2c is a plate-shaped part that is disposed on the downstream side of the heater core 4 of the upper passage R1 and is brought into a substantially horizontal state so as to vertically partition a downstream space of the heater core 4 of the upper passage R1. The upper passage partition plate 2c forms a guide passage R3 that guides a portion of the air that has passed through the heater core 4 between the upper passage partition plate 2c and the upper and lower partition plates 2b (downstream partition plate 2b3). Such a guide passage R3 has an inlet opening R31 provided to face the heater core 4, and an outlet opening R32 provided toward the upper and lower connection opening K1. In addition, an end part of the upper passage partition plate 2c on the outlet opening R32 side extends toward the upper and lower connection opening K1 such that the air discharged from the outlet opening R32 is guided to the upper and lower connection opening K1. That is, the upper passage partition plate 2c extends toward the upper and lower connection opening K1 at an outlet end of the guide passage R3.

A space above the upper passage partition plate 2c is an upper mixing space R4 where air heated by the heater core 4 and cold air that has bypassed the heater core 4 are mixed together. In addition, the upper passage partition plate 2c is disposed at a substantially intermediate position in a height direction of a region where the heater core 4 is disposed, in the upper passage R1. Accordingly, air, which has passed through the heater core 4, can be separately supplied to a side (that is, the guide passage R3) below the upper passage partition plate 2c, and a side (the upper mixing space R4) above the upper passage partition plate 2c.

The upper passage partition plate 2c and the heater core 4 are spaced apart from each other in the horizontal direction. That is, a gap is provided between the upper passage partition plate 2c and a downstream end surface of the heater core 4. The gap functions as a gap opening K2 that discharges air, which is going to pass through the heater core 4 and flow into the guide passage R3, to the upper mixing space R4 in a case where the guide passage R3 is closed by the guide passage opening/closing mechanism 10.

The upper passage partition plate 2c and the outer shell wall 2a are spaced apart from each other in the horizontal direction. That is, a gap is provided between the upper passage partition plate 2c and an inner wall surface of the outer shell wall 2a. The gap functions as a recirculation opening K3 that allows the air, which has passed through the guide passage R3, to be recirculated to the upper mixing space R4 in a case where a foot opening Kc to be described below is closed and the upper and lower connection opening K1 is opened.

The heater core upper end supporting wall 2d supports an upper end of the heater core 4. The heater core upper end supporting wall 2d is disposed in the upper passage R1, and partitions the upper passage R1 into a heater installation passage R5 where the heater core 4 is disposed, and a heater bypass passage R6 where the heater core 4 is not disposed. In the upper passage R1, as illustrated in FIG. 1, the heater installation passage R5 is disposed on an upper side, and the heater bypass passage R6 is disposed on a lower side. The heater installation passage R5 is connected to the guide passage R3 and the upper mixing space R4 on the downstream side.

The heater core lower end supporting wall 2e supports a lower end of the heater core 4. The heater core lower end supporting wall 2e is disposed in the lower passage R2, and partitions the lower passage R2 into a heater installation passage R7 where the heater core 4 is disposed, and a heater bypass passage R8 where the heater core 4 is not disposed. In the lower passage R2, as illustrated in FIG. 1, the heater installation passage R7 is disposed on an upper side, and the heater bypass passage R8 is disposed on a lower side.

A space of the lower passage R2 on the downstream side of the heater core lower end supporting wall 2e is a lower mixing space R9 where the air heated by the heater core 4 and the cold air that has bypassed the heater core 4 are mixed together. The heater installation passage R7 is connected to the lower mixing space R9 on the downstream side.

As illustrated in FIG. 1, the outer shell wall 2a is provided with a defroster opening Ka that communicates with the upper mixing space R4 and discharges conditioned air to be supplied toward a windowpane or the like of the vehicle, a face opening Kb that communicates with the upper mixing space R4 and discharges conditioned air to be supplied toward the vicinity of a passenger's face, and a foot opening Kc that communicates with the lower mixing space R9 and discharges conditioned air to be supplied toward passenger's foots. That is, the air-conditioning case 2 includes the defroster opening Ka, the face opening Kb, and the foot opening Kc as discharge openings for discharging conditioned air from the inside to the outside.

The defroster opening Ka is provided at an upper part of the outer shell wall 2a, and is connected to the upper mixing space R4 provided in the upper passage R1. The defroster opening Ka is openable and closable by the defroster opening opening/closing mechanism 7, and discharges the conditioned air in the upper mixing space R4 to the outside of the outer shell wall 2a in an opened state.

The face opening Kb is provided at the upper part of the outer shell wall 2a adjacent to the defroster opening Ka, and is connected to the upper mixing space R4 provided in the upper passage R1. The face opening Kb is openable and closable by the face opening opening/closing mechanism 8, and discharges the conditioned air in the upper mixing space R4 to the outside of the outer shell wall 2a in an opened state.

The foot opening Kc is provided at a lower part of the outer shell wall 2a, and is connected to the lower mixing space R9 provided in the lower passage R2. The foot opening Kc is openable and closable by the foot opening opening/closing mechanism 9, and discharges the conditioned air in the lower mixing space R9 to the outside of the outer shell wall 2a in an opened state.

The evaporator 3 is a heat exchanger that cools air by exchanging heat between a refrigerant to be supplied from the outside and air to be supplied to the inside of the air-conditioning case 2. The evaporator 3 is provided over the upper passage R1 and the lower passage R2 as illustrated in FIG. 1, and is disposed so as to fill the entire area of the upper passage R1 and the lower passage R2 as seen from the flow direction of air.

The heater core 4 is a heat exchanger that is disposed on a downstream side of the evaporator 3 and heats the air cooled by the evaporator 3. In addition, it is also possible to use an electric heater as the heater core 4. The heater core 4 is provided over the upper passage R1 and the lower passage R2 as illustrated in FIG. 1, and is disposed so as to fill the entire area of the heater installation passage R5 of the upper passage R1 and the heater installation passage R7 of the lower passage R2 as seen from the flow direction of air.

The upper air mixing door mechanism 5 is disposed between the evaporator 3 and the heater core 4 in the upper passage R1. The upper air mixing door mechanism 5 has a slide door 5a that has a length dimension of about half of the height dimension of the upper passage R1 and is slidable in an upward-downward direction, and a drive gear 5b that meshes with the slide door 5a and moves the slide door 5a in the upward-downward direction. Such an upper air mixing door mechanism 5 adjusts the position of the slide door 5a in the upward-downward direction with the power transmitted from the outside, thereby adjusting the opening ratio of the heater installation passage R5 and the heater bypass passage R6 in the upper passage R1.

The lower air mixing door mechanism 6 is disposed between the evaporator 3 and the heater core 4 in the lower passage R2. The lower air mixing door mechanism 6 has a slide door 6a that has a length dimension of about half of the height dimension of the lower passage R2 and is slidable in the upward-downward direction, and a drive gear 6b that meshes with the slide door 6a and moves the slide door 6a in the upward-downward direction. Such a lower air mixing door mechanism 6 adjusts the position of the slide door 6a in the upward-downward direction with the power transmitted from the outside, thereby adjusting the opening ratio of the heater installation passage R7 and the heater bypass passage R8 in the lower passage R2.

The defroster opening opening/closing mechanism 7 has a butterfly damper 7a that is rotated by transmitting power from the outside. The butterfly damper 7a performs opening and closing of the defroster opening Ka. The face opening opening/closing mechanism 8 has a butterfly damper 8a that is rotated by transmitting power from the outside. The butterfly damper 8a performs opening and closing of the face opening Kb. The foot opening opening/closing mechanism 9 has a butterfly damper 9a that is rotated by transmitting power from the outside. The butterfly damper 9a performs opening and closing of the foot opening Kc. In addition, it is also possible to include a rotary dumper, a door damper, or a slide damper instead of the butterfly damper 7a, the butterfly damper 8a, and the butterfly damper 9a.

The guide passage opening/closing mechanism 10 includes a shaft part 10a that is journaled to the outer shell wall 2a, an upper and lower connection opening opening/closing door 10b (a first sealing part) of which a root is fixed to the shaft part 10a, and a guide passage opening/closing door 10c (a second sealing part) that is connected to a distal end of the upper and lower connection opening opening/closing door 10b.

The shaft part 10a has the root of the upper and lower connection opening opening/closing door 10b fixed thereof, and transmits the rotational power transmitted from the outside to the upper and lower connection opening opening/closing door 10b and the guide passage opening/closing door 10c. The upper and lower connection opening opening/closing door 10b is a door-shaped sealing part that can open and close the upper and lower connection opening K1. The upper and lower connection opening opening/closing door 10b is rotating about the shaft part 10a, and thereby can be changed to postures including a first posture in which the upper and lower connection opening K1 is closed (posture illustrated in FIG. 1 and FIG. 2), a second posture in which the recirculation opening K3 (a posture illustrated in FIG. 3 to be described below), and a third posture in which the upper and lower connection opening K1 and the recirculation opening K3 are opened (a posture illustrated in FIG. 4 to be described below).

As illustrated in FIG. 1 and FIG. 2, the guide passage opening/closing door 10c is a door-shaped sealing part that closes an outlet opening R32 of the guide passage R3 in a state where the upper and lower connection opening opening/closing door 10b is in the first posture. That is, the guide passage opening/closing door 10c is connected to the upper and lower connection opening opening/closing door 10b at an angle at which the outlet opening R32 of the guide passage R3 is closed in a case where the upper and lower connection opening opening/closing door 10b closes the upper and lower connection opening K1.

In this way, the guide passage opening/closing mechanism 10 has the upper and lower connection opening opening/closing door 10b and the guide passage opening/closing door 10c that can be changed in posture about the shaft part 10a, and also closes the guide passage R3 in a state where the upper and lower connection opening K1 is closed.

Subsequently, the operation of the vehicular air conditioner 1 of the present embodiment configured in this way will be described with reference to FIG. 3 and FIG. 4 in addition to FIG. 1 and FIG. 2. In addition, in FIG. 1 to FIG. 4, arrows indicate the flow of air.

FIG. 1 illustrates a state where the upper and lower connection opening opening/closing door 10b of the guide passage opening/closing mechanism 10 is in the first posture in which the upper and lower connection opening K1 is closed as described above. Additionally, FIG. 3 is a vertical sectional view schematically illustrating a schematic configuration of the vehicular air conditioner 1, and illustrates a state where the upper and lower connection opening opening/closing door 10b of the guide passage opening/closing mechanism 10 is in the second posture in which the recirculation opening K3 is closed. Additionally, FIG. 3 is a vertical sectional view schematically illustrating a schematic configuration of the vehicular air conditioner 1, and illustrates a state where the upper and lower connection opening opening/closing door 10b of the guide passage opening/closing mechanism 10 is in the third posture in which the upper and lower connection opening K1 and the recirculation opening K3 is closed.

As illustrated in FIG. 1, the upper and lower connection opening opening/closing door 10b of the guide passage opening/closing mechanism 10 is brought into the first posture, and the foot opening Kc is brought into the opened state by the foot opening opening/closing mechanism 9. In this state, air is supplied to the upper passage R1 and the lower passage R2.

The air (for example, ambient air) supplied to the upper passage R1 has passed through the evaporator 3, and is then distributed to the heater installation passage R5 and the heater bypass passage R6 by the upper air mixing door mechanism 5. The air distributed to the heater installation passage R5 is heated by the heater core 4, and then, a portion thereof tends to flow into the guide passage R3. Here, if the upper and lower connection opening opening/closing door 10b is in the first posture and the guide passage R3 is closed by the guide passage opening/closing door 10c, air cannot flow into the guide passage R3, and the air, which tends to flow into the guide passage R3, flows into the upper mixing space R4 through the gap opening K2. That is, if the guide passage R3 is closed by the guide passage opening/closing door 10c, the total amount of air, which has passed through the heater installation passage R5, is supplied to the upper mixing space R4 without passing through the guide passage R3.

The air, which has passed through the heater installation passage R5, is mixed with the air supplied to the upper mixing space R4 through the heater bypass passage R6. As a result, the conditioned air adjusted to predetermined humidity and temperature is generated in the upper mixing space R4. The conditioned air generated in the upper mixing space R4 in this way is discharged from the opened defroster opening Ka or face opening Kb to the outside of the vehicular air conditioner 1. In FIG. 1, the defroster opening Ka is closed by the defroster opening opening/closing mechanism 7, and the face opening Kb is opened by the face opening opening/closing mechanism 8. For this reason, in the state illustrated in FIG. 1, the conditioned air generated in the upper mixing space R4 is discharged from the face opening Kb.

The air (for example, internal air) supplied to the lower passage R2 passes through the evaporator 3, and is then distributed to the heater installation passage R7 and the heater bypass passage R8 by the lower air mixing door mechanism 6. The air distributed to the heater installation passage R7 is heated by the heater core 4, and is then supplied to the lower mixing space R9.

The air, which has passed through the heater installation passage R7, is mixed with the air supplied to the lower mixing space R9 through the heater bypass passage R8. As a result, the conditioned air adjusted to predetermined humidity and temperature is generated in the lower mixing space R9. The conditioned air generated in the lower mixing space R9 in this way is discharged from the foot opening Kc opened by the foot opening opening/closing mechanism 9 to the outside of the vehicular air conditioner 1.

Figure 3:
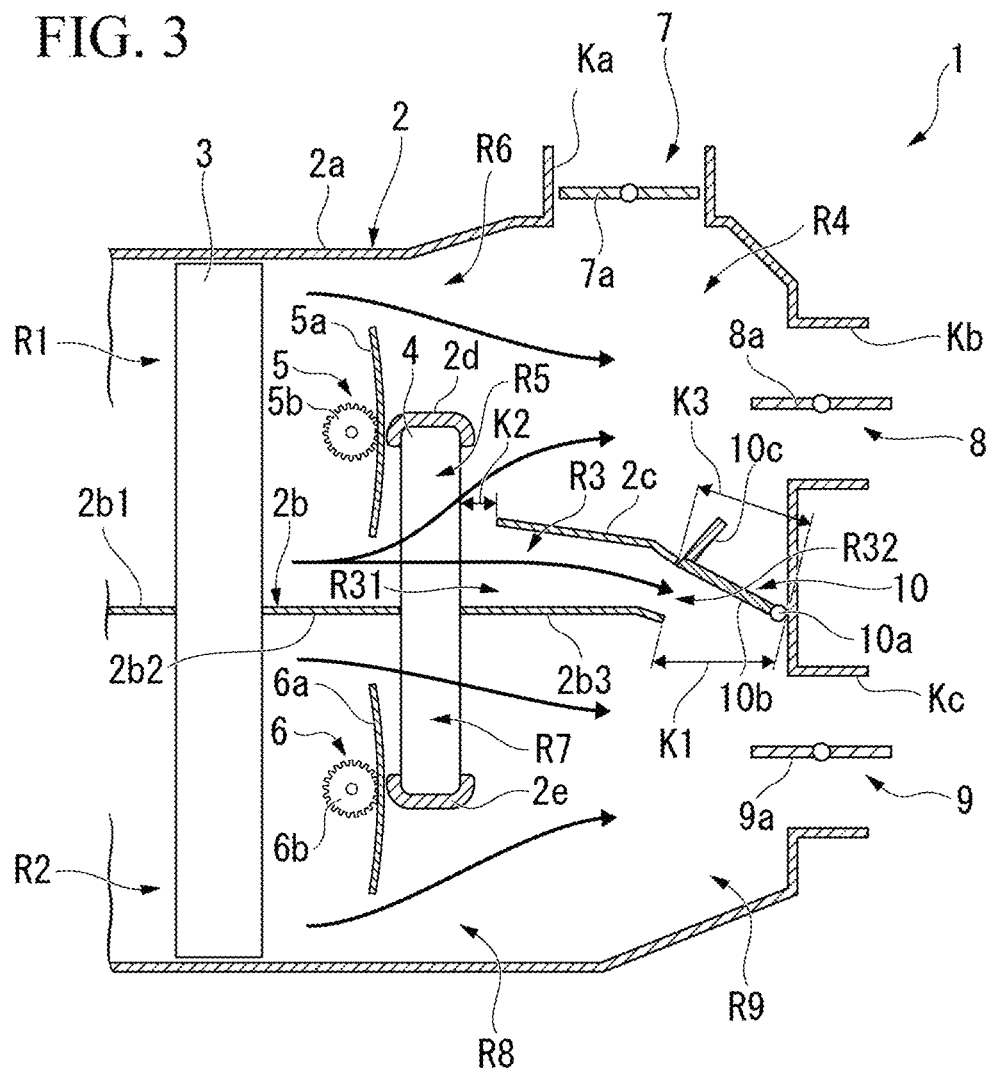
FIG. 3 is a schematic vertical sectional view illustrating the operation of the vehicular air conditioner in the same embodiment.

Additionally, as illustrated in FIG. 3, the upper and lower connection opening opening/closing door 10b of the guide passage opening/closing mechanism 10 is brought into the second posture, and the foot opening Kc is brought into the opened state by the foot opening opening/closing mechanism 9. In this state, air is supplied to the upper passage R1 and the lower passage R2. In this case, the guide passage R3 is opened by the guide passage opening/closing mechanism 10, and the recirculation opening K3 is brought into a closed state. For this reason, the air, which has flown into the guide passage R3, is guided to the lower mixing space R9 through the upper and lower connection opening K1, and is discharged from the foot opening Kc to the outside.

Figure 4:
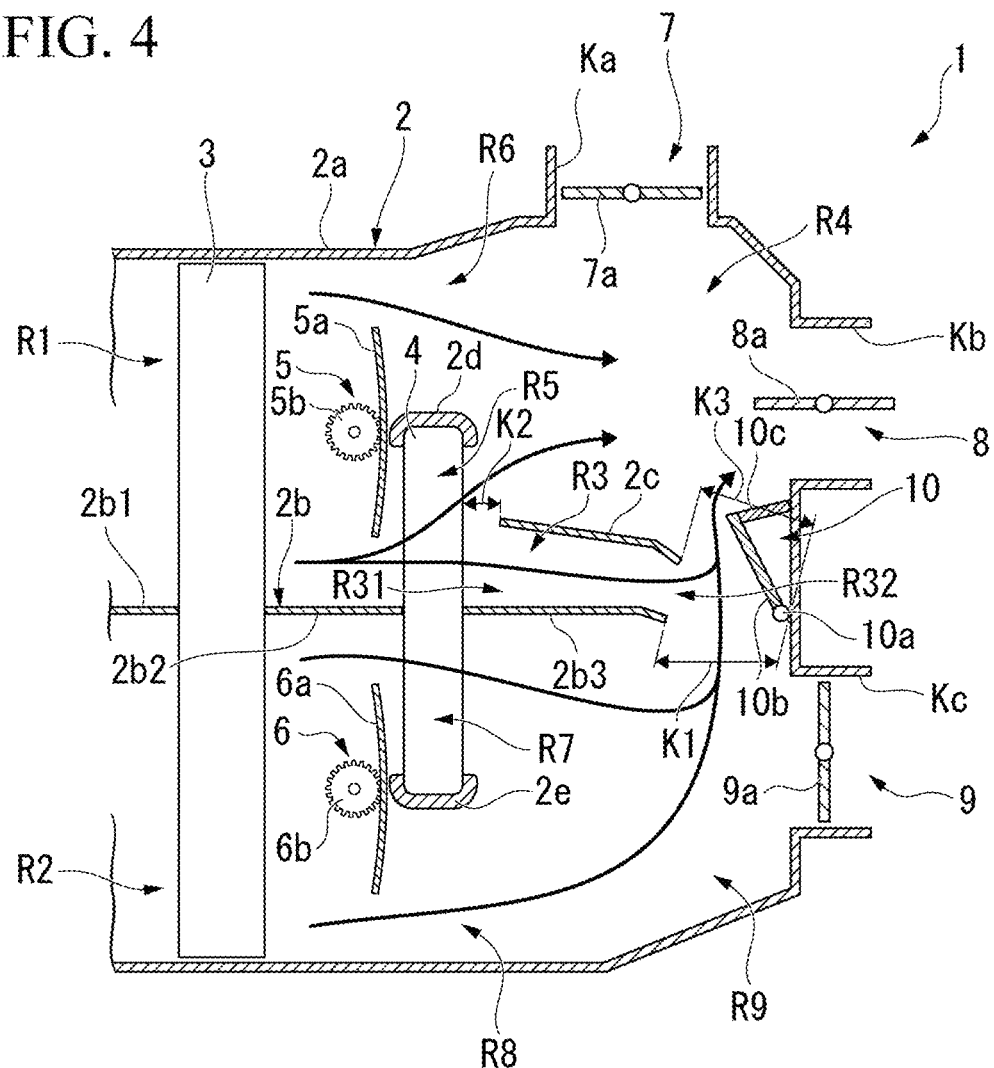
FIG. 4 is a schematic vertical sectional view illustrating the operation of the vehicular air conditioner in the same embodiment.

Additionally, as illustrated in FIG. 4, the upper and lower connection opening opening/closing door 10b of the guide passage opening/closing mechanism 10 is brought into the third posture, and the foot opening Kc is brought into a closed state by the foot opening opening/closing mechanism 9. In this state, air is supplied to the upper passage R1 and the lower passage R2. In this case, the upper and lower connection opening K1 and the recirculation opening K3 are opened. For that reason, the air supplied to the guide passage R3 is recirculated to the upper mixing space R4 together with the air that has passed through the upper and lower connection opening K1 from the lower passage R2, and is discharged from the opened defroster opening Ka or face opening Kb to the outside of the vehicular air conditioner 1.

According to the vehicular air conditioner 1 of the present embodiment, in a state where the upper and lower connection opening K1 that connects the upper passage R1 and the lower passage R2 is closed, the guide passage R3, which guides a portion of air toward the upper and lower connection opening K1, is closed by the guide passage opening/closing mechanism 10. For this reason, air is prevented from flowing into the guide passage R3 in a state where the upper and lower connection opening K1 is closed, and the air flowing through the upper passage R1 flows into the space above the upper passage partition plate 2c without going via the guide passage R3 and the recirculation opening K3. For this reason, according to the vehicular air conditioner 1 of the present embodiment, it is possible to reduce the pressure loss inside the air-conditioning case 2 in a case where the upper and lower connection opening K1 that connects the upper passage R1 and the lower passage R2 is closed.

Additionally, in the vehicular air conditioner 1 of the present embodiment, the guide passage opening/closing mechanism 10 has the upper and lower connection opening opening/closing door 10b that can open and close the upper and lower connection opening K1, and the guide passage opening/closing door 10c that can open and close the outlet opening R32 of the guide passage R3, and closes the outlet opening R32 in a state where the upper and lower connection opening opening/closing door 10b closes the upper and lower connection opening K1. For this reason, it is possible to simultaneously close the upper and lower connection opening K1 and the guide passage R3 by changing the posture of the upper and lower connection opening opening/closing door 10b.

Additionally, in the vehicular air conditioner 1 of the present embodiment, the upper passage partition plate 2c (downstream partition plate 2b3) extends toward the upper and lower connection opening K1 at the outlet end of the guide passage R3.

For this reason, it is possible to discharge the air flowing through the guide passage R3, toward the upper and lower connection opening K1.

Additionally, in the vehicular air conditioner 1 of the present embodiment, the gap opening K2 is provided between the heater core 4, and the upstream end of the upper passage partition plate 2c. For this reason, even in a case where the guide passage R3 is closed, the air heated at the heater installation passage R5 can be smoothly guided to the upper mixing space R4. For example, it is also possible to adopt a configuration in which the gap opening K2 is not provided. In such a case, air cannot flow into the guide passage R3 at all from the heater installation passage R5, and air will incline and flows while being biased to the upper mixing space R4 side inside the heater core 4 or on the upstream side of the heater core 4. That is, if the gap opening K2 is not provided, the effective flow passage area of the heater installation passage R5 decreases substantially. In contrast, even in a case where the guide passage R3 is closed by providing the gap opening K2, it is possible to efficiently heat air in the heater installation passage R5.

(Second Embodiment)

Next, a second embodiment of the invention will be described with reference to FIG. 5. In addition, in the description of the present embodiment, the description of the same portions as those of the above first embodiment will be omitted or simplified.

Figure 5:
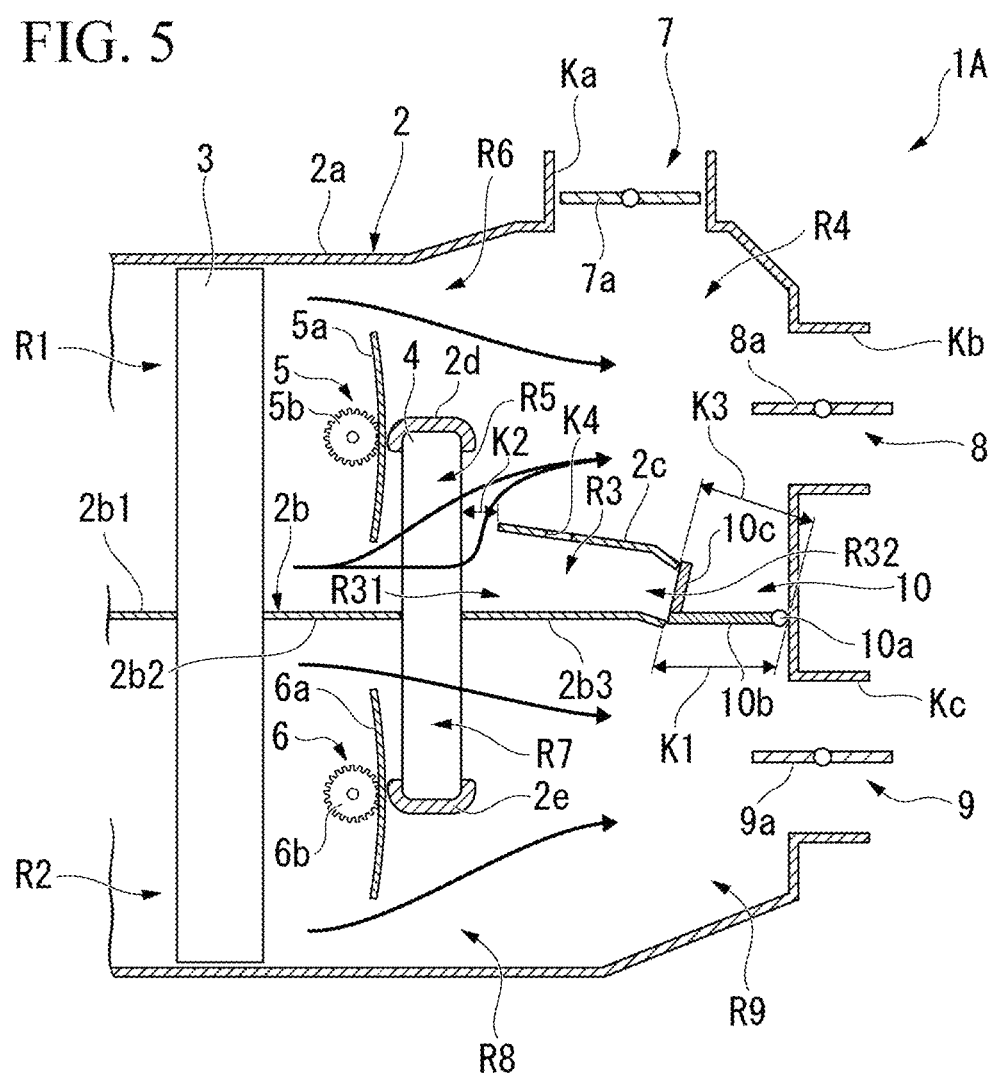
FIG. 5 is a vertical sectional view schematically illustrating a schematic configuration of a vehicular air conditioner in a second embodiment of the invention.

FIG. 5 is a vertical sectional view schematically illustrating a schematic configuration of a vehicular air conditioner 1A of the present embodiment.

As illustrated in this view, in the vehicular air conditioner 1A of the present embodiment, a through opening K4 is provided in the upper passage partition plate 2c between the upstream end and the downstream end. The through opening K4 is an opening that connects between the guide passage R3, and the space (upper mixing space R4) above the upper passage partition plate 2c.

By providing the through opening K4, the air, which has flown into the guide passage R3, can be guided to the upper mixing space R4 without going via the outlet opening R32 of the guide passage R3. For this reason, even in a case where the outlet opening R32 of the guide passage R3 is closed by the guide passage opening/closing mechanism 10, the air, which has flown into the guide passage R3, can be guided to the upper mixing space R4.

According to such a vehicular air conditioner 1A of the present embodiment, even in a case where the outlet opening R32 of the guide passage R3 is closed by the guide passage opening/closing mechanism 10, air can be made to flow into the guide passage R3 through the heater core 4. For that reason, it is possible to efficiently heat air in the heater installation passage R5.

(Third Embodiment) Next, a third embodiment of the invention will be described with reference to FIG. 6 to FIG. 9. In addition, in the description of the present embodiment, the description of the same portions as those of the above first embodiment will be omitted or simplified.

Figure 6:
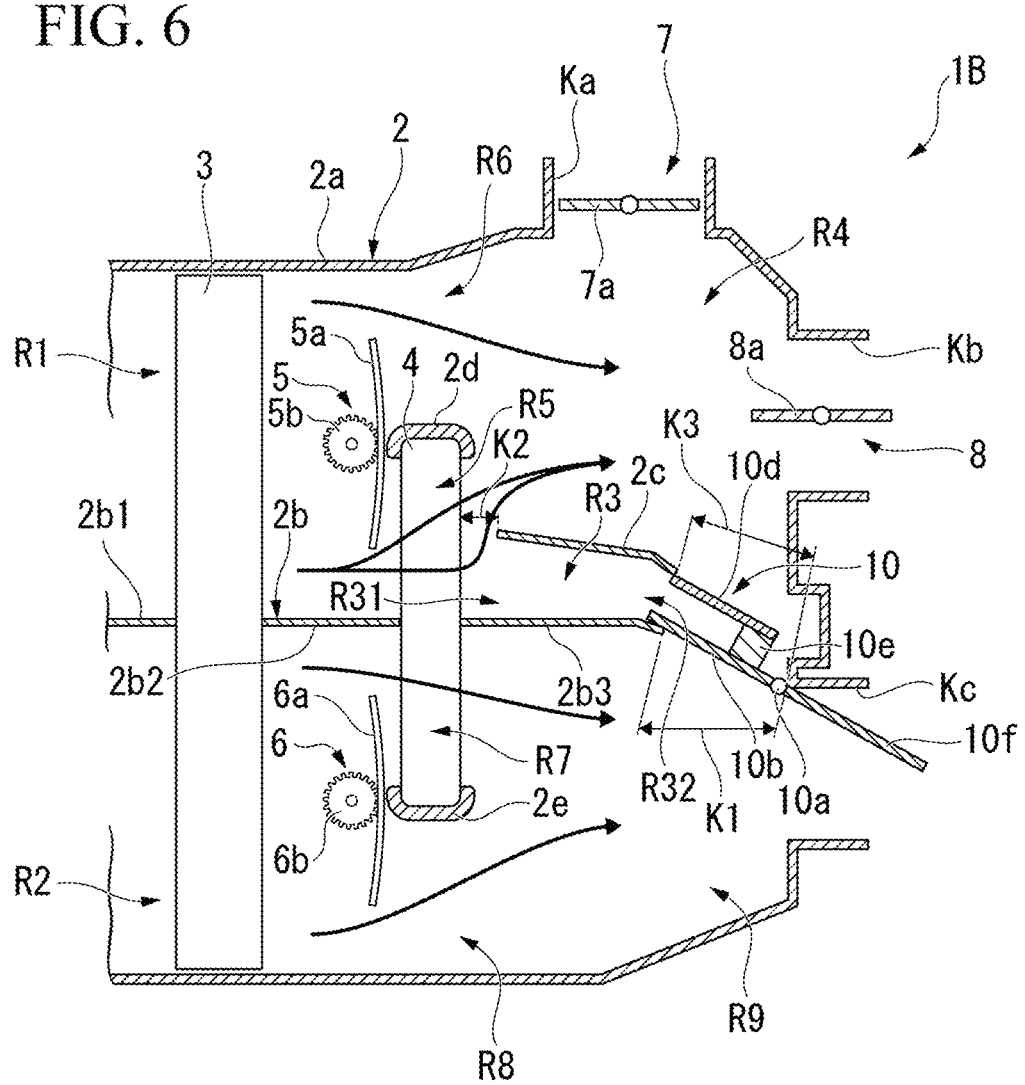
FIG. 6 is a vertical sectional view schematically illustrating a schematic configuration of a vehicular air conditioner in a third embodiment of the invention.

FIG. 6 is a vertical sectional view schematically illustrating a schematic configuration of a vehicular air conditioner 1B of the present embodiment.

As illustrated in this view, the vehicular air conditioner 1B of the present embodiment does not include the foot opening opening/closing mechanism 9 in the above first embodiment, and the guide passage opening/closing mechanism 10 performs the opening and closing of the foot opening Kc.

Figure 7:
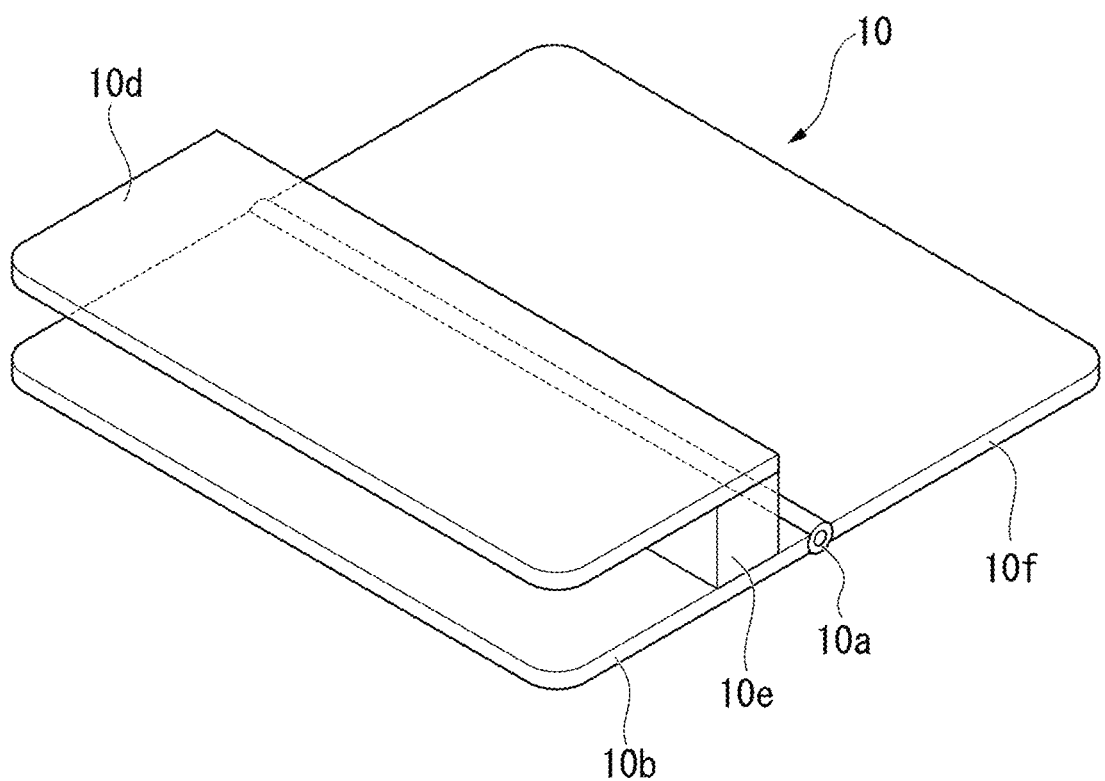
FIG. 7 is a perspective view of a guide passage opening/closing mechanism provided in the vehicular air conditioner in the same embodiment.

FIG. 7 is a perspective view of the guide passage opening/closing mechanism 10 provided in the vehicular air conditioner 1B of the present embodiment. As illustrated in FIG. 6 and FIG. 7, in the present embodiment, the guide passage opening/closing mechanism 10 includes a recirculation opening opening/closing door 10d (a third sealing part), a connecting part 10e, and a foot opening opening/closing door 10f (a fourth sealing part), in addition to the shaft part 10a and the upper and lower connection opening opening/closing door 10b in the above first embodiment.

The recirculation opening opening/closing door 10d is a sealing part that can open and close the recirculation opening K3, and is connected to the upper and lower connection opening opening/closing door 10b via the connecting part 10e. The recirculation opening opening/closing door 10d closes the recirculation opening K3 in a state where the upper and lower connection opening opening/closing door 10b closes the upper and lower connection opening K1. Additionally, the recirculation opening opening/closing door 10d opens the recirculation opening K3 in a state where the upper and lower connection opening opening/closing door 10b opens the upper and lower connection opening K1.

The connecting part 10e is a part that connects the upper and lower connection opening opening/closing door 10b and the recirculation opening opening/closing door 10d, is connected to the upper and lower connection opening opening/closing door 10b and the recirculation opening opening/closing door 10d, and seals a gap between the upper and lower connection opening opening/closing door 10b and the recirculation opening opening/closing door 10d.

The foot opening opening/closing door 10f is connected to the shaft part 10a, and can be changed to postures including an opened posture in which the foot opening Kc is opened, and a closed posture in which the foot opening Kc is closed, depending on the rotation of the shaft part 10a. In the present embodiment, the foot opening opening/closing door 10f opens the foot opening Kc in a state where the upper and lower connection opening K1 is closed by the upper and lower connection opening opening/closing door 10b, and closes the foot opening Kc in a state where the upper and lower connection opening K1 is opened by the upper and lower connection opening opening/closing door 10b.

The operation of the vehicular air conditioner 1B of the present embodiment having such a configuration will be described with reference to FIG. 8 and FIG. 9 in addition to FIG. 6.

FIG. 6 illustrates a state where the upper and lower connection opening opening/closing door 10b of the guide passage opening/closing mechanism 10 is in the first posture in which the upper and lower connection opening K1 is closed. FIG. 8 is a vertical sectional view schematically illustrating the schematic configuration of the vehicular air conditioner 1B, and illustrates the state of being the second posture in that the upper and lower connection opening opening/closing door 10b of the guide passage opening/closing mechanism 10 closes the recirculation opening K3. FIG. 9 is a vertical sectional view schematically illustrating a schematic configuration of the vehicular air conditioner 1B, and illustrates a state where the upper and lower connection opening opening/closing door 10b of the guide passage opening/closing mechanism 10 is in the third posture in which the upper and lower connection opening K1 and the recirculation opening K3 is closed.

As illustrated in FIG. 6, if the upper and lower connection opening opening/closing door 10b of the guide passage opening/closing mechanism 10 is brought into the first posture, the recirculation opening opening/closing door 10d closes the recirculation opening K3, and the foot opening opening/closing doors 10f opens the foot opening Kc.

In this state, air is supplied to the upper passage R1 and the lower passage R2. Here, if the upper and lower connection opening opening/closing door 10b is in the first posture and the recirculation opening K3 is closed by the recirculation opening opening/closing door 10d, air can no longer pass through the guide passage R3, and the guide passage R3 is brought into the closed state. For this reason, air cannot flow air into the guide passage R3, and the air, which tends to flow into the guide passage R3, flows into the upper mixing space R4 through the gap opening K2.

Figure 8:
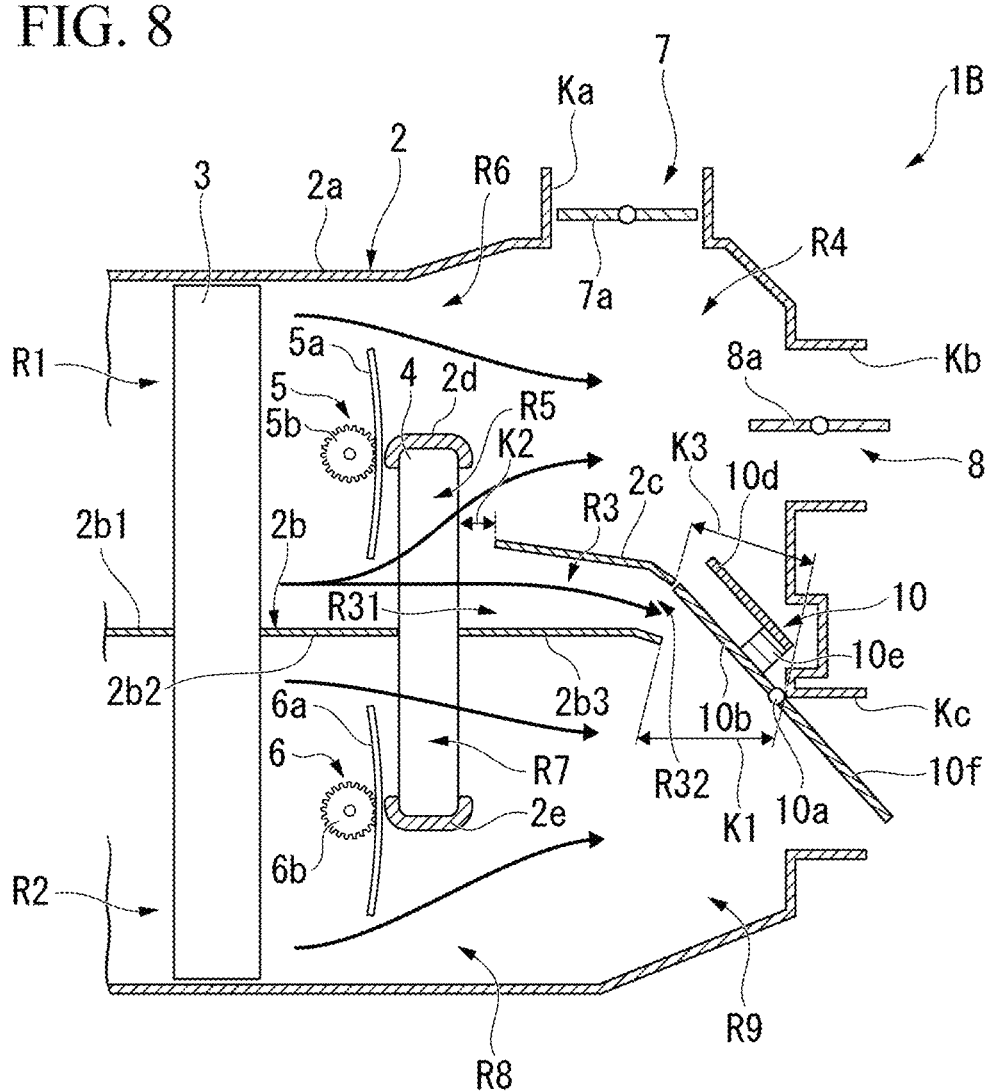
FIG. 8 is a schematic vertical sectional view illustrating the operation of the vehicular air conditioner in the same embodiment.

Additionally, as illustrated in FIG. 8, if the upper and lower connection opening opening/closing door 10b of the guide passage opening/closing mechanism 10 is brought into the second posture, the recirculation opening opening/closing doors 10d opens the recirculation opening K3, but the upper and lower connection opening opening/closing door 10b closes the recirculation opening K3. Additionally, the foot opening opening/closing door 10f opens the foot opening Kc. In this state, air is supplied to the upper passage R1 and the lower passage R2. In this case, the guide passage R3 is opened by the guide passage opening/closing mechanism 10, and the recirculation opening K3 is brought into the closed state. For this reason, the air, which has flown into the guide passage R3, is guided to the lower mixing space R9 through the upper and lower connection opening K1, and is discharged from the foot opening Kc to the outside.

Figure 9:
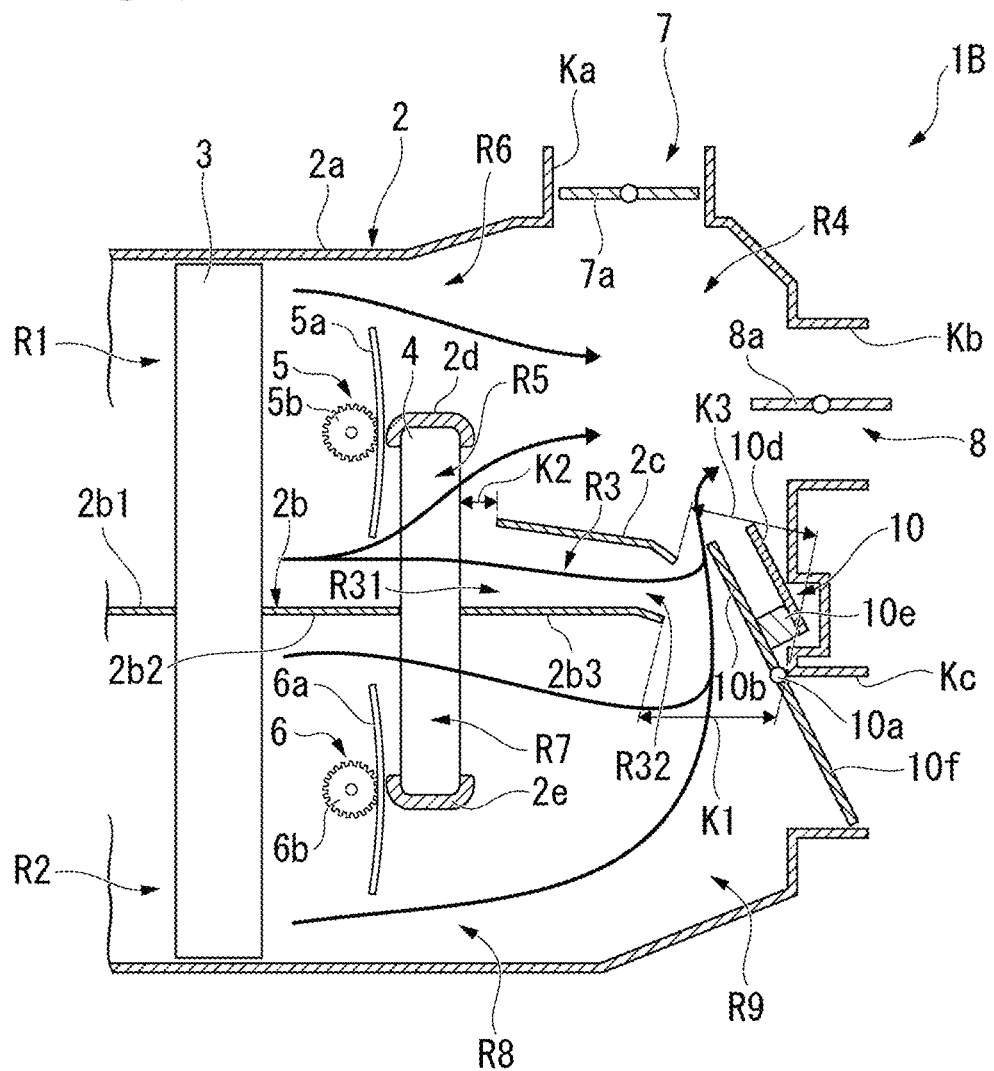
FIG. 9 is a schematic vertical sectional view illustrating the operation of the vehicular air conditioner in the same embodiment.

Additionally, as illustrated in FIG. 9, the upper and lower connection opening opening/closing door 10b of the guide passage opening/closing mechanism 10 is brought into the third posture, and the foot opening Kc is brought into the closed state by the foot opening opening/closing door 10f. In this state, air is supplied to the upper passage R1 and the lower passage R2. In this case, the upper and lower connection opening K1 and the recirculation opening K3 are opened. Therefore, the air supplied to the guide passage R3 is recirculated to the upper mixing space R4 together with the air that has passed through the upper and lower connection opening K1 from the lower passage R2, and is discharged from the opened defroster opening Ka or face opening Kb to the outside of the vehicular air conditioner 1B.

According to the vehicular air conditioner 1B of the present embodiment the guide passage opening/closing mechanism 10 includes the foot opening opening/closing door 10f. Therefore, it is not necessary to separately install the foot opening opening/closing mechanism 9, and it is possible to simplify the device.

Although the preferred embodiments of the invention have been described above, referring to the accompanying drawings, it is needless to say that the invention is not limited to only the configurations of the above respective embodiments. Various shapes, combinations, and the like of the respective constituent members that are shown in the above-described embodiments, are merely examples, and can be variously changed on the basis of design requirements or the like without departing from the spirit of the invention.

For example, in the above embodiment, a configuration in which the upper and lower connection opening K1 is opened and closed by the guide passage opening/closing mechanism 10 has been described. However, the invention is not limited only to this configuration. It is also possible to adopt a configuration in which a mechanism that opens and closes the upper and lower connection opening K1 may be provided separately from the guide passage opening/closing mechanism 10.

Additionally, it is also possible to apply the invention to a vehicular air conditioner that can independently adjust the temperatures of a driver side and a seat side of a vehicle or a vehicular air conditioner that can supply conditioned air to a backseat.

Additionally, in the above second embodiment, a configuration in which the through opening K4 is one has been described. However, the invention is not limited only to this configuration. For example, it is also possible to adopt a configuration including a plurality of the through openings K4.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

1: vehicular air conditioner
1A: vehicular air conditioner
1B: vehicular air conditioner
2: air-conditioning case
2a: outer shell wall
2b: upper and lower partition plate
2c: upper passage partition plate
3: evaporator
4: heater core (heating unit)
10: guide passage opening/closing mechanism
10a: shaft part
10b: upper and lower connection opening opening/closing door (first sealing part)
10c: guide passage opening/closing door (second sealing part)
10d: recirculation opening opening/closing door (third sealing part)
10e: connecting part
10f: foot opening opening/closing door (fourth sealing part)
K1: upper and lower connection opening
K2: gap opening
K3: recirculation opening
K4: through opening
R1: upper passage
R2: lower passage
R3: guide passage

What is claimed is:

1. A vehicular air conditioner comprising:
an air-conditioning case that has an upper passage and a lower passage which are partitioned by an upper and lower partition plate therebetween;
a heating unit that is disposed over the upper passage and the lower passage;
an upper passage partition plate that is disposed downstream of the heating unit of the upper passage and forms a guide passage that guides a portion of air, which has passed the heating unit, toward an upper and lower connection opening that connects the upper passage and the lower passage; and
a guide passage opening/closing unit that closes the guide passage in a state where the upper and lower connection opening is closed,
wherein the guide passage opening/closing comprises a first sealing part and a second sealing part connected to an end of the first sealing part.

2. The vehicular air conditioner according to claim 1, wherein the
first sealing part allows the upper and lower connection opening to be opened and closed, and
the second sealing part allows an outlet opening of the guide passage to be opened and closed, and closes the outlet opening in a state where the first sealing part closes the upper and lower connection opening.

3. The vehicular air conditioner according to claim 1, wherein the upper passage partition plate extends toward the upper and lower connection opening at an outlet end of the guide passage.

4. The vehicular air conditioner according to any one of claim 1,
wherein a gap opening is provided between the heating unit, and an upstream end of the upper passage partition plate.

5. The vehicular air conditioner according to claim 1,
wherein the upper passage partition plate has a through opening that connects the guide passage and a space above the upper passage partition plate between an upstream end and a downstream end of the upper passage partition plate.

6. A vehicular air conditioner comprising:
an air-conditioning case that has an upper passage and a lower passage which are partitioned by an upper and lower partition plate therebetween;
a heating unit that is disposed over the upper passage and the lower passage;

an upper passage partition plate that is disposed downstream of the heating unit of the upper passage and forms a guide passage that guides a portion of air, which has passed the heating unit, toward an upper and lower connection opening that connects the upper passage and the lower passage; and a guide passage opening/closing unit, wherein a recirculation opening that allows air which is discharged from an outlet opening of the guide passage to be recirculated to a space above the upper passage partition plate is provided inside the air-conditioning case, and wherein the guide passage opening/closing unit has
- a first sealing part that allows the upper and lower connection opening to be opened and closed,
- a third sealing part that is attached to the first sealing part with a space therebetween, and
- a connecting part that connects the first sealing part and the third sealing part, and wherein in a state where the first sealing part abuts on the upper and lower partition plate, the third sealing part abuts on the upper passage partition plate to stop a flow of the air through the recirculation opening.

7. The vehicular air conditioner according to claim 6, wherein a foot opening, which communicates with the lower passage and discharges the air to be supplied to passenger's feet is provided in the air-conditioning case, and wherein the guide passage opening/closing unit has a fourth sealing part that allows the foot opening to be opened and closed.

8. The vehicular air conditioner according to claim 7, wherein the fourth sealing part opens the foot opening in a state where the upper and lower connection opening is closed, and closes the foot opening in a state where the upper and lower connection opening is opened.

* * * * *